Figure 1:
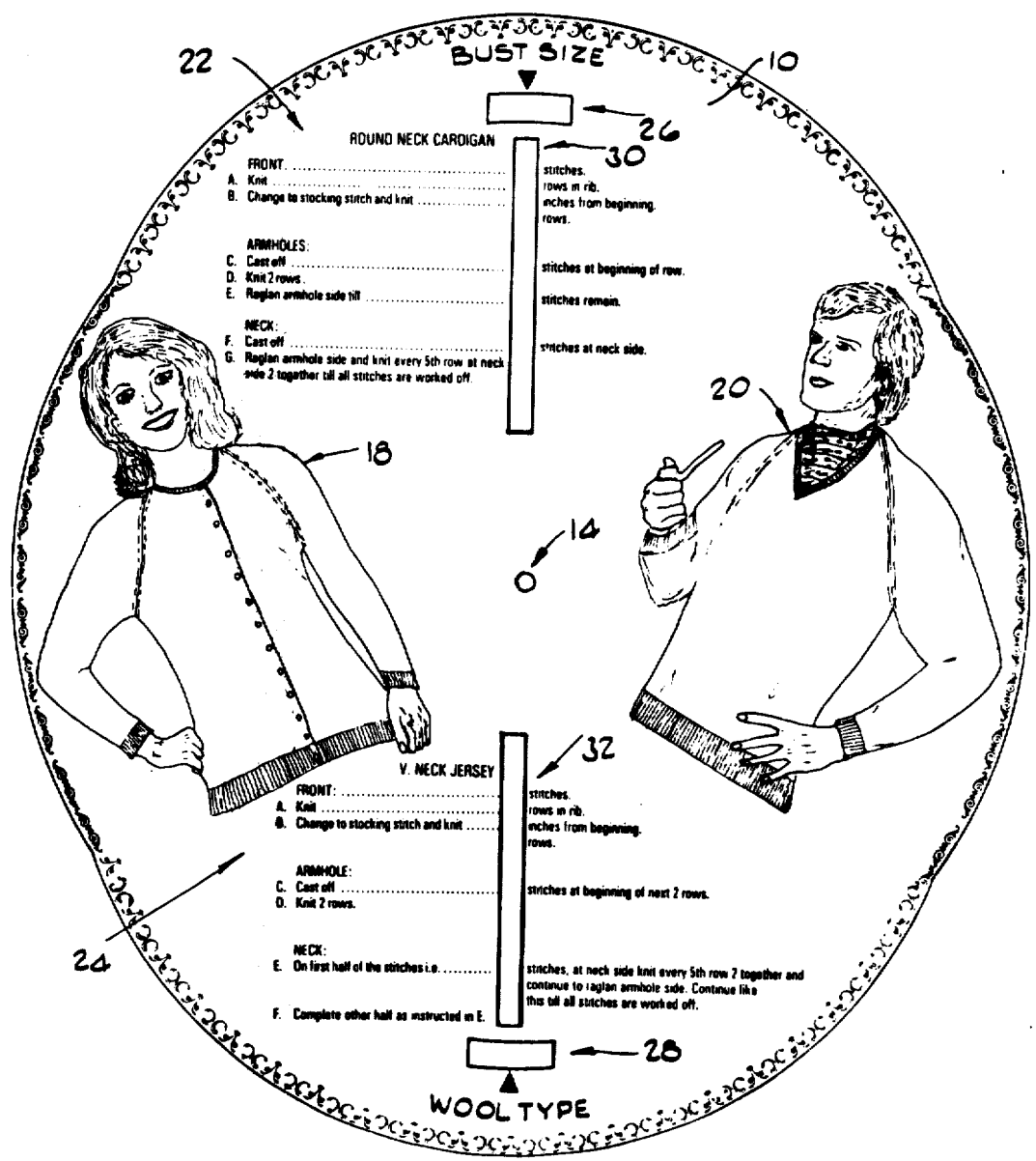

United States Patent [19]

Werber

[11] 3,995,379
[45] Dec. 7, 1976

[54] KNITTING

[76] Inventor: Fred Willi Karl Werber, P.O. Box 1659, Johannesburg, Transvaal, South Africa

[22] Filed: Sept. 4, 1975

[21] Appl. No.: 610,491

Related U.S. Application Data

[63] Continuation of Ser. No. 472,585, May 23, 1974, abandoned.

[30] Foreign Application Priority Data

Apr. 29, 1974 South Africa .................... 74/2681

[52] U.S. Cl. .................... 35/15; 35/74; 40/70 R
[51] Int. Cl.² .................... G09B 19/20; G09B 1/20
[58] Field of Search ............ 35/15, 53, 56, 74, 75; 40/70 R; 235/88 R, 88 G

[56] References Cited

UNITED STATES PATENTS

| | | | |
|---|---|---|---|
| 1,793,251 | 2/1931 | Rohr | 35/74 X |
| 1,989,353 | 1/1935 | Davis | 235/88 X |
| 2,508,894 | 5/1950 | Schloer | 40/70 |
| 3,210,866 | 10/1965 | Brunelle | 35/74 |

FOREIGN PATENTS OR APPLICATIONS

| | | | |
|---|---|---|---|
| 948,732 | 1/1949 | France | 235/88 |
| 684,903 | 12/1952 | United Kingdom | 235/88 |

*Primary Examiner*—Harland S. Skogquist
*Attorney, Agent, or Firm*—Ladas, Parry, Von Gehr, Goldsmith & Deschamps

[57] ABSTRACT

A device for determining the number of stitches required in the knitting of garments makes use of two relatively movable members, one of which is marked out with bust sizes and stitches, and the other being a cursor by means of which stitches may be read off against bust sizes and knitting instructions.

3 Claims, 4 Drawing Figures

KNITTING

This is a continuation of application Ser. No. 472,585 filed May 23, 1974 and now abandoned.

BACKGROUND TO THE INVENTION

This invention relates to improvements in or relating to knitting. The invention relates in particular to a device for determining the number of stitches required in the knitting of garments.

According to the invention there is provided a device for determining the number of stitches required in the knitting of a garment, the means including two relatively movable members, one of the members having markings representing bust sizes and stitches, and the other member being adapted to be positioned with respect to the first member so that stitches may be read off against bust sizes.

In addition to having markings representing bust sizes and stitches, the first member may have further markings representing the type of knitting thread, such as wool type, for example 3-ply, 4-ply and double knit. In this arrangement the second member may be positionable with respect to the first member so that after a particular bust size and wool type have been selected, the number of stitches required in the knitting of a garment having the selected bust size and by using the wool type selected, may be read off from the first member.

The markings may conveniently be numbers. Thus the bust sizes may for example range from 32 to 44.

Conveniently, each bust size may be repeated as many times as the number of wool types which are indicated. For example, if three types of wool are indicated such as 3-ply, 4-ply and double knit, each bust size number may be repeated three times. Opposite each bust size number thus repeated, different stitch numbers will be provided in order to allow for the different type of wool employed.

The first member may have markings in respect of one garment only, or more than one garment.

The garment or garments in respect of which the number of stitches are reflected on the first member, may be illustrated on the second member or on a separate sheet, or on a pack in which the device may be packed.

The second member may be in the form of a cursor which may be transparent or opaque. When the cursor is transparent a hair line may be provided thereon by means of which the markings which represent bust sizes, stitches and wool types may be aligned during relative movement of the one member with respect to the other member. Alternatively, when the cursor is of an opaque material, windows may be provided therein through which bust sizes, wool types and stitches may be viewed. Thus when only one garment is represented on the device, three windows may be provided, namely for viewing the bust size, the wool type and the number of stitches, while if two garments are represented, four windows may be provided, namely to view bust size, wool type and one window for each of the garments for viewing the number of stitches.

The device may take several forms. In one form the members may be discs which may be pivotally secured to one another at a centrally positioned pivot which is concentric with both discs so that the discs are arcuately movable relative to one another. In this form the bottom member may have the markings thereon while the top member may be the cursor having the hair line or the windows. The top member may conveniently be larger than the bottom member, for example by being of a slight oval shape, so as to totally conceal the bottom member except for those regions of the bottom member which are visible through the windows.

In an alternative form, the relatively movable members may be two drums which are rotatably mounted with respect to one another.

As a further alternative arrangement, the relatively movable members may be mounted so as to be linearly movable with respect to one another.

The device may conveniently be provided on relatively thin sheet material, for example cardboard or a synthetic plastics material. In this form the device may be easily packed, stored, despatched and displayed.

The markings on the first member reflecting the number of stitches, may include several rows of figures. Each row of figure may represent different parts of the garment represented thereon. Knitting instructions may be provided on the top member adjacent the stitches window to provide instructions for knitting the various parts of the garment.

The invention also extends to a pack including a calculating means in accordance with the invention.

Figure 2:
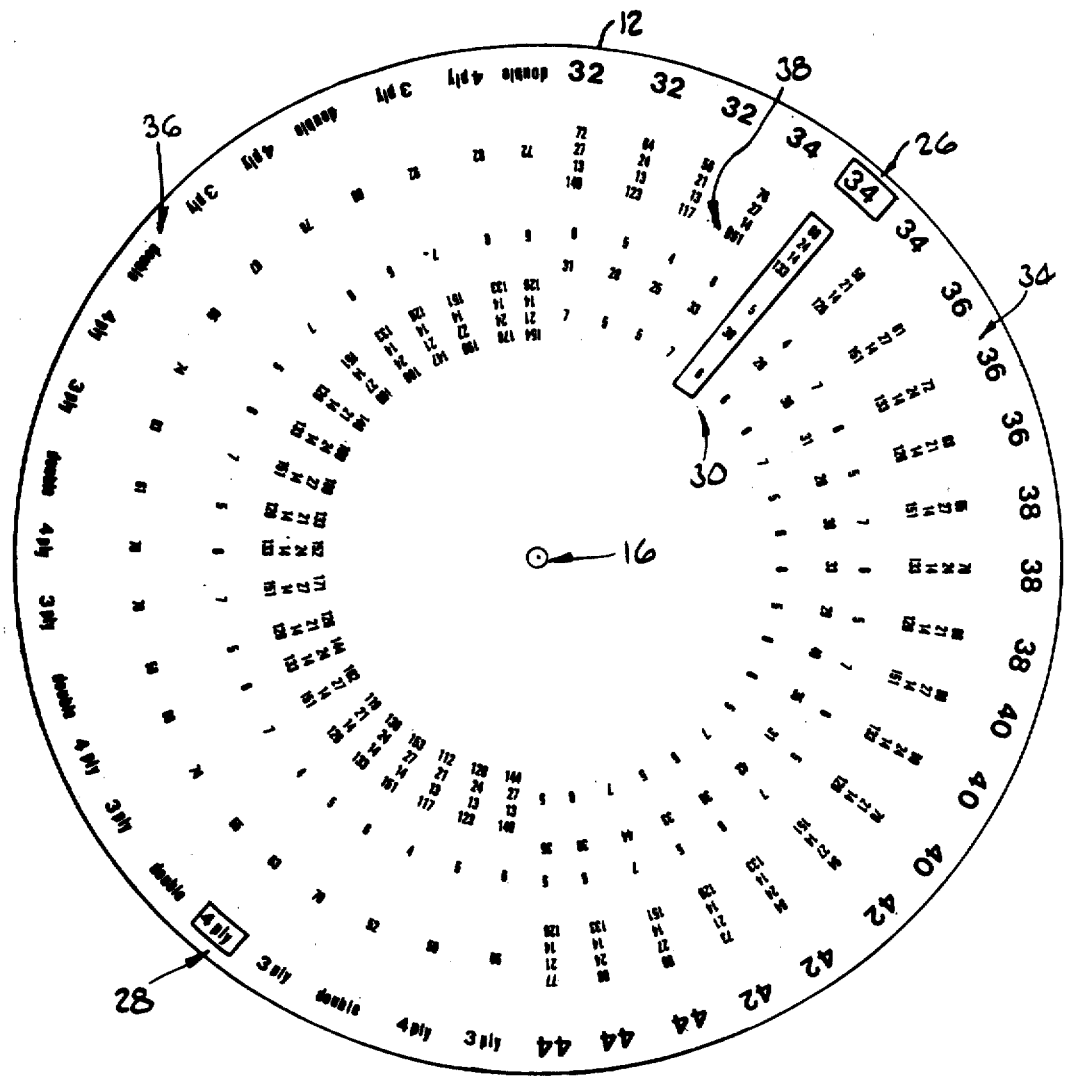
Figure 3:
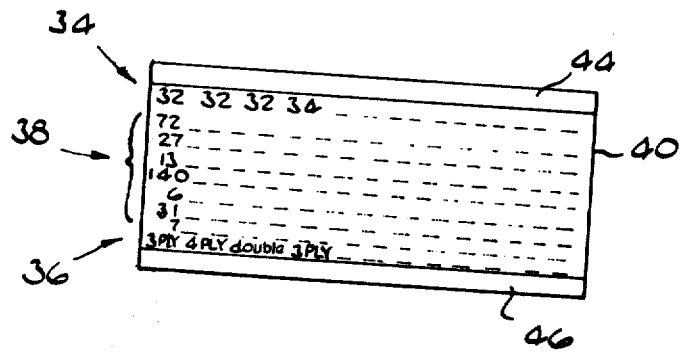
Figure 4:
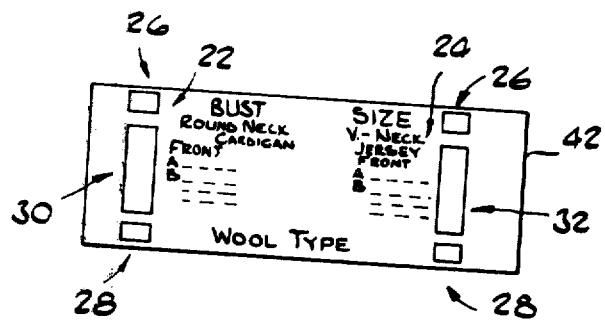

The invention will now be described by way of examples with reference to the accompanying drawings, in which:

FIGS. 1 and 2 show respectively the top and bottom members of a device in accordance with the invention in which the members are in the form of discs which are rotatably secured to one another; and FIGS. 3 and 4 show respectively the bottom and top members of an alternative form of a device in accordance with the invention in which the members are linearly movable with respect to one another.

Referring to FIGS. 1 and 2, reference numeral 10 indicates the top member and reference numeral 12 the bottom member of the one form of a device for calculating the stitches required in the knitting of a garment. The members 10 and 12 are rotatably secured to one another by means of a centrally positioned pivot (not shown) passing through centrally positioned apertures 14 and 16 extending through the members 10 and 12 respectively. When the two members are thus pivotally secured to one another, the member 10 is positioned over the member 12 and the members may be rotated with respect to one another.

The member 10 has illustrations 18 and 20 on it of garments which may be knitted in accordance with instructions reflected respectively in the tables 22 and 24 which are also printed on this member.

The member 10 is of an opaque material, such as cardboard. It has four windows 26, 28, 30 and 32 extending through it and which represent respectively bust size, wool type, number of stitches associated with the knitting instructions in table 22, and number of stitches associated with the knitting instructions in table 24.

The member 12 is a circular disc as shown. It has marked on it a series of numbers 32 to 34 indicated generally by reference numeral 34 and representing bust sizes. It further has marked on it wool types indicated generally by reference numeral 36 and representing wool types 3-ply, 4-ply and double knit. The member 12 further has marked on it opposite each bust size number and opposite each wool type number, a series of numbers representing the numbers of stitches associated with the knitting instructions reflected in tables 22 and 24 on the member 10. These numbers are indicated generally by reference numeral 38.

Referring further to the member 12, it will be noted that each bust size number appears three times, but the stitch numbers appearing opposite the respective three bust numbers are different. This is to allow for the three wool types 3-ply, 4-ply and double knit indicated generally by reference numeral 36.

The device comprising the two members 10 and 12 is used as follows. Say for example it is desired to knit the garment 18. The knitting instructions set out in table 22 will then apply. Assume furthermore that the garment is to be knitted in a size 34 and that 4-ply wool will be used. The top member 10 is now rotated with respect to the bottom member 12 until a bust size 34 appears in the window 26 and the wool type 4-ply in the window 28. A series of figures will then be visible through the window 30 as shown in FIG. 2. The knitting instructions appearing in table 22 are now read off in conjunction with the figures appearing in the window 30. The instructions are straight forward and will read:

| | |
|---|---|
| Front | 68 stitches |
| A. Knit | 24 rows in rib |
| B. Change to stocking stitch and knit | 14 inches for beginning | and so on.

In order to knit the garment 20, exactly the same procedure is followed as outlined above except that the window 32 is used instead of the window 30 as described above.

Referring to FIGS. 3 and 4, a device is shown comprising a bottom member 40 as shown in FIG. 3, and a top member 42 as shown in FIG. 4. The bottom member 40 has two raised shoulders 44 and 46 between which the top member 42 is slidably receivable.

The bottom member 40 is marked out in exactly the same manner as the bottom member 12 shown in FIG. 2, namely with numbers 34 representing bust sizes, numbers 36 representing wool types, and numbers 38 representing stitches.

The top member 42 which is in the form of a slider is similar to the top member 10 shown in FIG. 1 and is of an opaque material through which windows 26, 28, 30 and 32 are provided representing bust size wool type and stitches. Tables 22 and 26 setting out knitting instructions for the two types of garments 18 and 22 as shown in FIG. 1, are provided on the slider member 42. In order to be able to accommodate the figures for two garments, two windows 26 and two windows 28 are provided together with the windows 30 and 32, while two sets of the figures 34, 36 and 38 are provided on the bottom member 40, one set from the middle to the left of the member 40, while the other set is provided from the middle to the right of the member 40.

In order to use the device comprising the members 40 and 42, the member 42 is inserted between the shoulders 40 and 46 to be positioned over the member 40. The procedure for operating the device is exactly the same as that described with reference to the members 10 and 12 in FIGS. 1 and 2 except that the member 42 is slid with respect to the bottom member 40 whereas the members 10 and 12 are rotated with respect to one another.

The calculating devices shown in FIGS. 1 and 2 and in FIGS. 3 and 4 are easy to use and provide easy to follow instructions for determining the number of stitches required in the knitting of garments.

I claim:

1. A device for determining the number of stitches and associated information required in the knitting of at least two garments of the same bust size but of different respective styles, the device including two relatively movable members, one of the members having markings representing different bust sizes, markings representing different knitting thread types, and a plurality of rows of figures, and the other member having indicated thereon a bust size datum marking, a knitting thread type datum marking, and a plurality of knitting instructions associated respectively with said rows of figures, some of the rows of figures representing numbers of stitches and other rows representing associated information, and said other member being movable with respect to said one member to position any selected one of said markings representing different bust sizes adjacent said bust size datum marking and any selected one of said markings representing different knitting thread types adjacent said knitting thread type datum marking so that when the bust size marking representing a selected bust size and the knitting thread type marking representing a selected thread type are adjacent to said bust size datum marking and said knitting thread type datum marking respectively, numbers of stitches and associated information appropriate for knitting at least two garments of the selected bust size but of different respective styles from the selected thread type may be read off simultaneously against knitting instructions, and there being on one of the members respective illustrations of garments of said different styles.

2. A device according to claim 1, in which the member which is positionable with respect to the marked member is in the form of a cursor of opaque material having windows through which markings on the marked member may be viewed.

3. A device according to claim 1, in which the members are discs which are secured to one another by means of a centrally positioned pivot so that the discs are arcuately movable with respect to one another about the centrally-positioned pivot.

* * * * *